(12) United States Patent
Zhu et al.

(10) Patent No.: US 11,260,880 B2
(45) Date of Patent: Mar. 1, 2022

(54) MAP-LESS AND LOCALIZATION-LESS LANE FOLLOWING METHOD FOR AUTONOMOUS DRIVING OF AUTONOMOUS DRIVING VEHICLES ON HIGHWAY

(71) Applicants: Baidu USA LLC, Sunnyvale, CA (US); Baidu.com Times Technology (Beijing) Co., Ltd., Beijing (CN)

(72) Inventors: Fan Zhu, Sunnyvale, CA (US); Qi Kong, Sunnyvale, CA (US); Yuchang Pan, Beijing (CN); Feiyi Jiang, Beijing (CN); Xin Xu, Beijing (CN); Xiaoxin Fu, Beijing (CN); Zhongpu Xia, Beijing (CN); Chunming Zhao, Beijing (CN); Liangliang Zhang, San Jose, CA (US); Weicheng Zhu, Sunnyvale, CA (US); Li Zhuang, Sunnyvale, CA (US); Haoyang Fan, Sunnyvale, CA (US); Hui Jiang, Beijing (CN); Jiaming Tao, Sunnyvale, CA (US)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 823 days.

(21) Appl. No.: 16/067,556

(22) PCT Filed: Apr. 18, 2018

(86) PCT No.: PCT/CN2018/083557
§ 371 (c)(1),
(2) Date: Jun. 29, 2018

(87) PCT Pub. No.: WO2019/200563
PCT Pub. Date: Oct. 24, 2019

(65) Prior Publication Data
US 2021/0163037 A1    Jun. 3, 2021

(51) Int. Cl.
*B60W 60/00* (2020.01)
*B60W 30/09* (2012.01)
(Continued)

(52) U.S. Cl.
CPC .......... *B60W 60/001* (2020.02); *B60W 30/09* (2013.01); *B60W 30/0956* (2013.01);
(Continued)

(58) Field of Classification Search
CPC .. B60W 60/001; B60W 30/143; B60W 30/09; B60W 30/0956; B60W 30/12;
(Continued)

(56) References Cited

U.S. PATENT DOCUMENTS 9,796,378 B2 * 10/2017 Tsuruta ................. B60W 30/10
2003/0141965 A1 * 7/2003 Gunderson ............ B60Q 9/008
340/431
(Continued)

*Primary Examiner* — Abby Y Lin
*Assistant Examiner* — Dylan M Katz
(74) *Attorney, Agent, or Firm* — Womble Bond Dickinson (US) LLP

(57) ABSTRACT

In one embodiment, instead of using map data, a relative coordinate system is utilized to assist perception of the driving environment surrounding an ADV for some driving situations. One of such driving situations is driving on a highway. Typically, a highway has fewer intersections and exits. The relative coordinate system is utilized based on the relative lane configuration and relative obstacle information to control the ADV to simply follow the lane and avoid potential collision with any obstacles discovered within the road, without having to use map data. Once the relative lane configuration and obstacle information have been determined, regular path and speed planning and optimization can be performed to generate a trajectory to drive the ADV. Such a perception system is referred to as a relative perception system based on a relative coordinate system.

18 Claims, 11 Drawing Sheets

(51) Int. Cl.
*B60W 30/095* (2012.01)
*B60W 30/12* (2020.01)
*B60W 30/14* (2006.01)
*G01C 21/34* (2006.01)
*G08G 1/16* (2006.01)
*G01C 21/36* (2006.01)

(52) U.S. Cl.
CPC .......... *B60W 30/12* (2013.01); *B60W 30/143* (2013.01); *G01C 21/3407* (2013.01); *G08G 1/167* (2013.01); *B60W 2552/53* (2020.02); *G01C 21/3602* (2013.01)

(58) Field of Classification Search
CPC ........... B60W 2552/53; G01C 21/3407; G01C 21/3602; G08G 1/167
See application file for complete search history.

(56) References Cited

U.S. PATENT DOCUMENTS

| | | | |
|---|---|---|---|
| 2004/0061596 A1* | 4/2004 | Egami | G08G 1/165 340/425.5 |
| 2011/0246040 A1* | 10/2011 | Nakayama | B60T 8/17557 701/70 |
| 2013/0063599 A1* | 3/2013 | Imai | G06K 9/00798 348/148 |
| 2015/0356869 A1* | 12/2015 | Young | B60Q 9/008 340/901 |
| 2017/0236422 A1* | 8/2017 | Naka | B60W 30/12 701/301 |
| 2017/0315551 A1* | 11/2017 | Mimura | B62D 15/025 |
| 2017/0320500 A1* | 11/2017 | Yoo | B60W 30/0956 |
| 2018/0297640 A1* | 10/2018 | Fujii | B62D 15/0255 |
| 2020/0108827 A1* | 4/2020 | Kanoh | B60W 30/165 |

\* cited by examiner

MAP-LESS AND LOCALIZATION-LESS LANE FOLLOWING METHOD FOR AUTONOMOUS DRIVING OF AUTONOMOUS DRIVING VEHICLES ON HIGHWAY

CROSS-REFERENCE TO RELATED APPLICATION

This patent application is a U.S. National Phase Application under 35 U.S.C. § 371 of International Application No. PCT/CN2018/083557, filed Apr. 18, 2018, entitled "MAP-LESS AND LOCALIZATION-LESS LANE FOLLOWING METHOD FOR AUTONOMOUS DRIVING OF AUTONOMOUS DRIVING VEHICLES ON HIGHWAY," which is incorporated by reference herein by its entirety.

TECHNICAL FIELD

Embodiments of the present disclosure relate generally to operating autonomous vehicles. More particularly, embodiments of the disclosure relate to map-less and localization-less highway following method of autonomous driving.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. In general, in order to drive an autonomous driving vehicle (ADV) in a lane of a road, the lane configuration of the lane has been determined and the obstacles in or near the lane have to be identified. Conventional autonomous driving systems utilize map data to determine the lane configuration (e.g., shape and lane width of the lane), referred to herein as part of localization process. Such a localization system is referred to as a global or absolute localization system, in which the lane configuration is determined at a global or absolute coordinate basis. However, such map data sometimes may not be available. For example, if the lane or road is new and the map data has not been updated in time. In other situations, the map data may not be updated due to network traffic congestion.

SUMMARY

Embodiments of the present disclosure provide a computer-implemented method for generating a trajectory for operating an autonomous driving vehicle to follow lanes, a non-transitory machine-readable medium and a data processing system.

In an aspect of the disclosure, the computer-implemented method for generating a trajectory for operating an autonomous driving vehicle to follow lanes includes: determining a driving environment surrounding an autonomous driving vehicle (ADV) driving on a lane based on sensor data obtained from a plurality of sensors; determining a lane configuration of the lane relative to a current location of the ADV based on perception data of the driving environment, without using map data of a map associated with the lane; determining obstacle information of the obstacle relative to the ADV, including a relative position of the obstacle relative to the current location of the ADV; generating a local view frame based on the lane configuration and the obstacle information, the local view frame describing the lane configuration and the obstacle from a view point of the ADV without map information; and generating a trajectory for the ADV to follow the lane for a next driving cycle based on the local view frame.

In another aspect of the disclosure, the non-transitory machine-readable medium has instructions stored therein, which when executed by a processor, cause the processor to perform operations. The operations include: determining a driving environment surrounding an autonomous driving vehicle (ADV) driving on a lane based on sensor data obtained from a plurality of sensors of the ADV, including perceiving an obstacle; determining a lane configuration of the lane relative to a current location of the ADV based on perception data of the driving environment, without using map data of a map associated with the lane; determining obstacle information of the obstacle relative to the ADV, including a relative position of the obstacle relative to the current location of the ADV; generating a local view frame based on the lane configuration and the obstacle information of the obstacle, the local view frame describing the lane configuration and the obstacle from a view point of the ADV without map information; and generating a trajectory to control the ADV to follow the lane for a next driving cycle based on the local view frame.

In a further aspect of the disclosure, the data processing system comprises a processer and a memory coupled to the processor to store instructions, which when executed by the processor, cause the processor to perform operations. The operations include: determining a driving environment surrounding an autonomous driving vehicle (ADV) driving on a lane based on sensor data obtained from a plurality of sensors of the ADV, including perceiving an obstacle, determining a lane configuration of the lane relative to a current location of the ADV based on perception data of the driving environment, without using map data of a map associated with the lane, determining obstacle information of the obstacle relative to the ADV, including a relative position of the obstacle relative to the current location of the ADV, generating a local view frame based on the lane configuration and the obstacle information of the obstacle, the local view frame describing the lane configuration and the obstacle from a view point of the ADV without map information, and generating a trajectory to control the ADV to follow the lane for a next driving cycle based on the local view frame.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
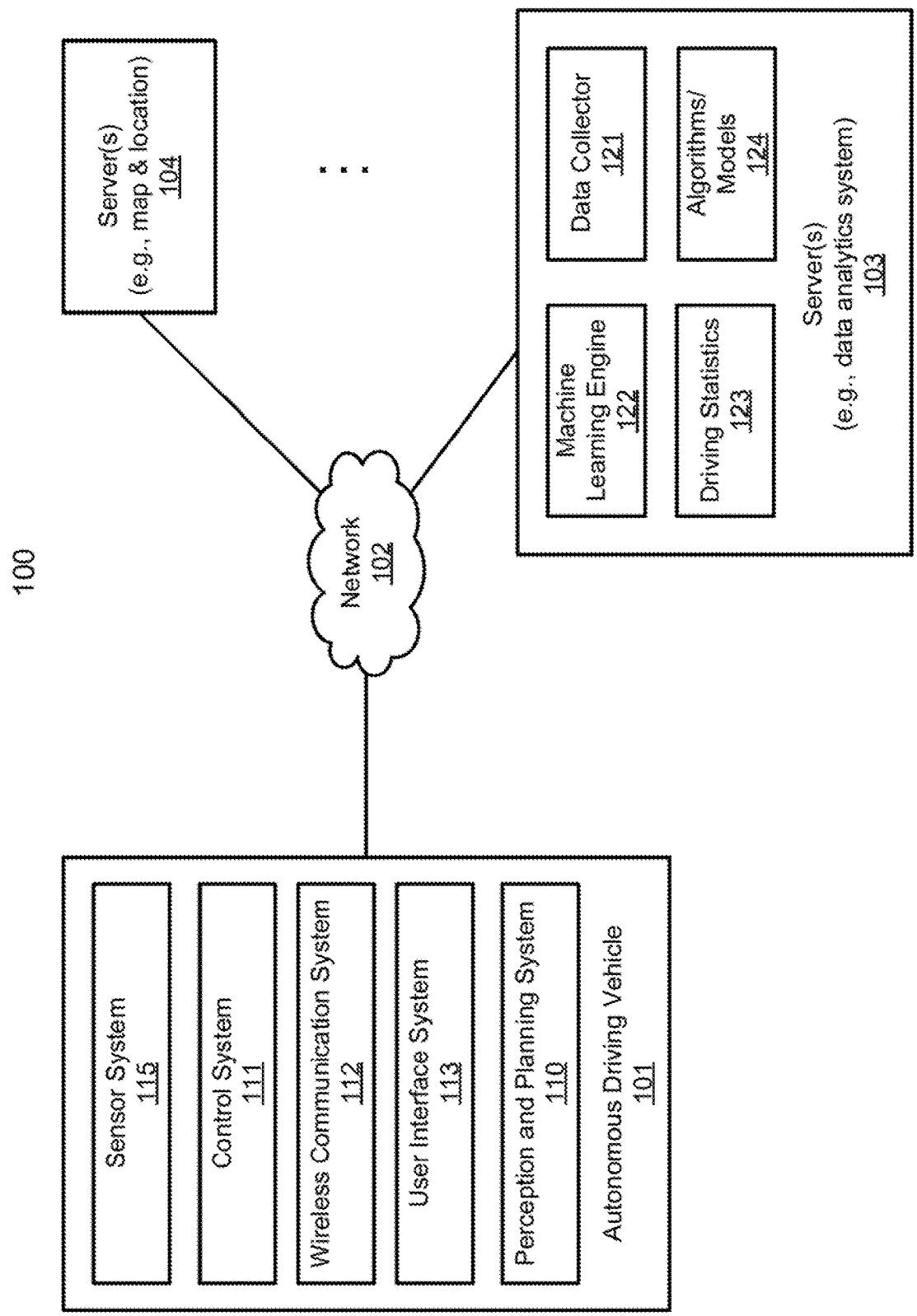
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, instead of using map data, a relative coordinate system is utilized to assist perception and/or localization of the driving environment surrounding an ADV for some driving situations. One of such driving situations is driving on a highway. Typically, a highway has fewer intersections and exits. The relative coordinate system is utilized based on the relative lane configuration and relative obstacle information relative to the ADV to control the ADV to simply follow the lane and avoid potential collision with any obstacles discovered within the road, without having to use map data. Once the relative lane configuration and obstacle information have been determined, regular path and speed planning and optimization can be performed as usual to generate a trajectory to drive the ADV. Such a localization system is referred to as a relative localization system based on a relative coordinate system.

According to one embodiment, a driving environment surrounding an ADV driving on a lane is perceived based on sensor data obtained from a variety of sensors mounted on the ADV, including perceiving at least one obstacle. A lane configuration of the lane is determined relative to a current location of the ADV based on perception data of the driving environment without using map data of a map associated with the lane. Obstacle information describing the at least one obstacle is determined based on the perception data. The obstacle information includes the relative location information of the obstacle with respect to the current location of the ADV (e.g., within the local driving environment such as within a lane or lanes). A local view frame is generated based on the lane configuration and the obstacle information. The local view frame includes information describing the lane configuration and the obstacle information from a view point of the ADV without map information. A trajectory is generated to control the ADV to follow the lane for a next driving cycle based on the local view frame. The trajectory is configured from the view point of the ADV in a relative coordinate manner.

In one embodiment, the above process is iteratively performed for each driving cycle and a local view frame generated for each driving cycle is stored and maintained in a database in a persistent storage (e.g., hard disk) for the purpose of tracking the movement of the ADV and the obstacles relative to each other, as well as the lane curve and shape, etc. As a result, the driving environment of the ADV may be represented by a sequence of local view frames at different points in time. In one embodiment, the local view frames are utilized to generate a trajectory to drive the ADV to follow the lane without using map data, in response to determining that the lane is a part of a highway.

If the highway includes multiple lanes, a local view frame is generated for each of the lanes and a trajectory is generated for each of the lanes based on the corresponding local view frames. One of the trajectories is selected as the final trajectory to drive the ADV based on a cost associated with the trajectory. The cost of a trajectory can be calculated based on a variety of cost factors using one or more cost functions, such as potential risk of colliding with an obstacle, comfort levels of passengers, etc. In one embodiment, in determining the lane configuration of the lane, the images captured by the sensors of the ADV are analyzed to measure a first distance between the ADV and a first edge of the lane and to measure a second distance between the ADV and a second edge of the lane. The first distance and the second distance are utilized to calculate a lane width of the lane as a part of lane configuration. Based on the lane width, a center point of the lane can be calculated (also referred to as a center point or reference point). The reference points of a sequence of local view frames can be utilized to derive a reference line of the lane.

In one embodiment, based on the reference line of the lane and the current location of the ADV, a station-lateral (SL) map is generated to map the relative position (e.g., x, y coordinate) of the obstacles relative to the reference line of the lane and the current location of the ADV. For example, coordinate x may represent a longitudinal distance between an obstacle and the current location of the ADV, while coordinate y may represent a lateral distance between the obstacle and the reference line of the lane. The SL map may be utilized to plan and optimize the shape of a trajectory to navigate between the obstacles without collision while providing maximum comfort to the passengers. According to another embodiment, based on the reference line of the lane and the current location of the ADV, a station-time (ST) graph is generated to map the relative position of the obstacles relative to the current location of the ADV at different points in time in the future. Thus, coordinate y represents a distance between the obstacles and the ADV, while coordinate x represents time. The ST graph may be utilized to optimize the speed of the ADV at different points in time to navigate through the obstacles without collision while providing a maximum comfort level to the passengers.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
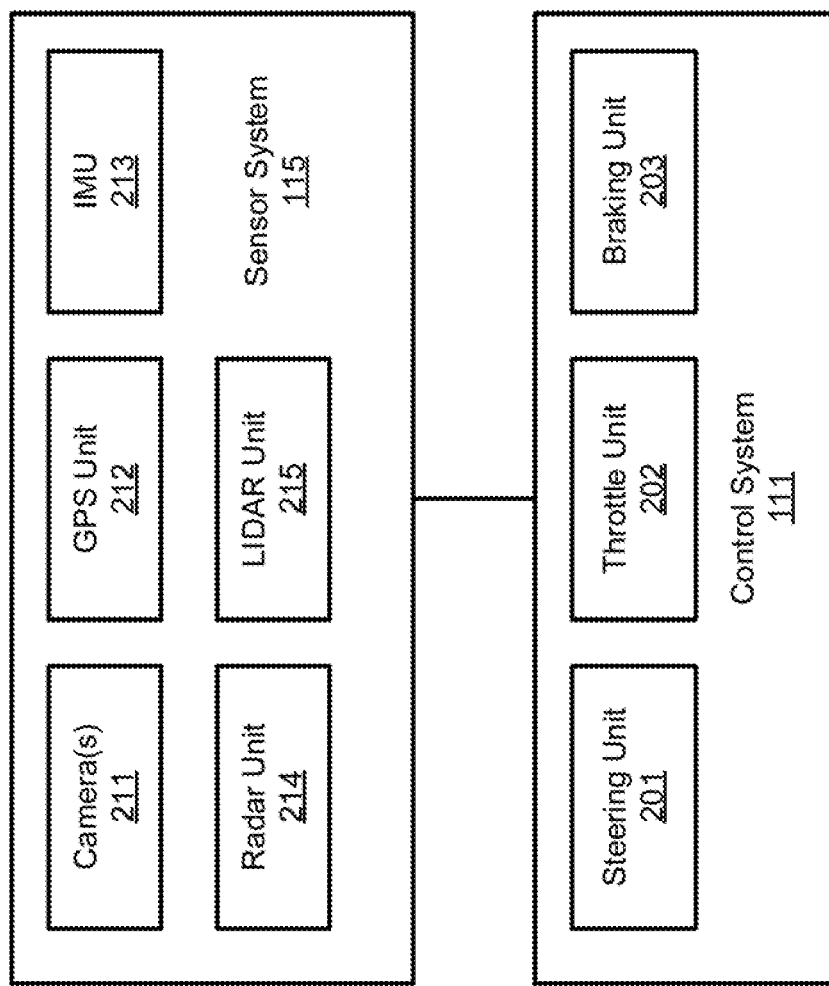
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Algorithms 124 include relative coordinate algorithms to calculate a relative position of an obstacle relative to a current location of an ADV and algorithms to determine lane configuration of a lane relative to the ADV without using map data. Algorithms 124 may further include an algorithm to determine whether an ADV is currently driving on a highway for the purpose of invoking a relative or local coordinate system.

Figure 3A:
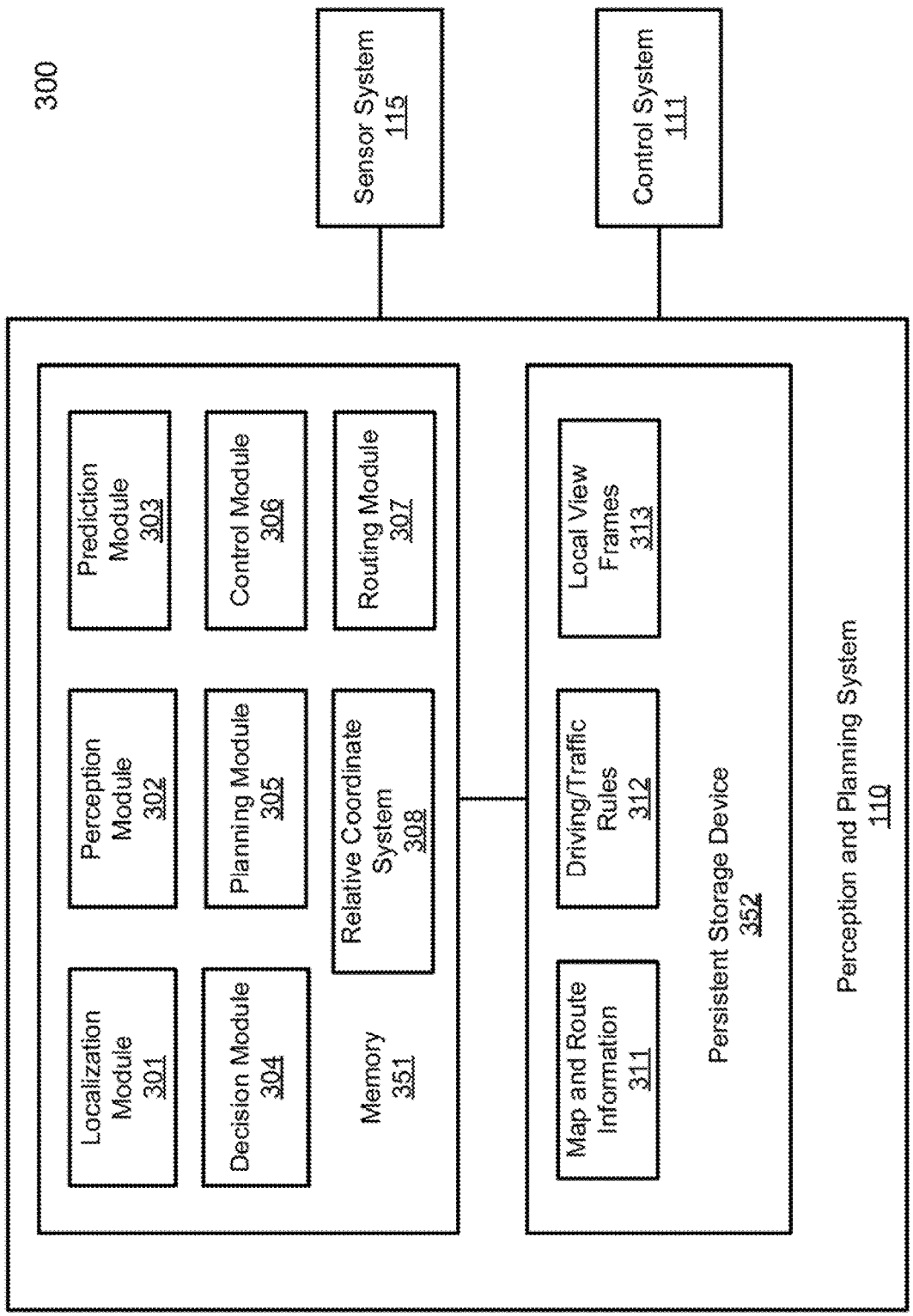
FIGS. 3A-3B are block diagrams illustrating an example of a perception and planning system used with an autonomous vehicle according to one embodiment.
Figure 3B:
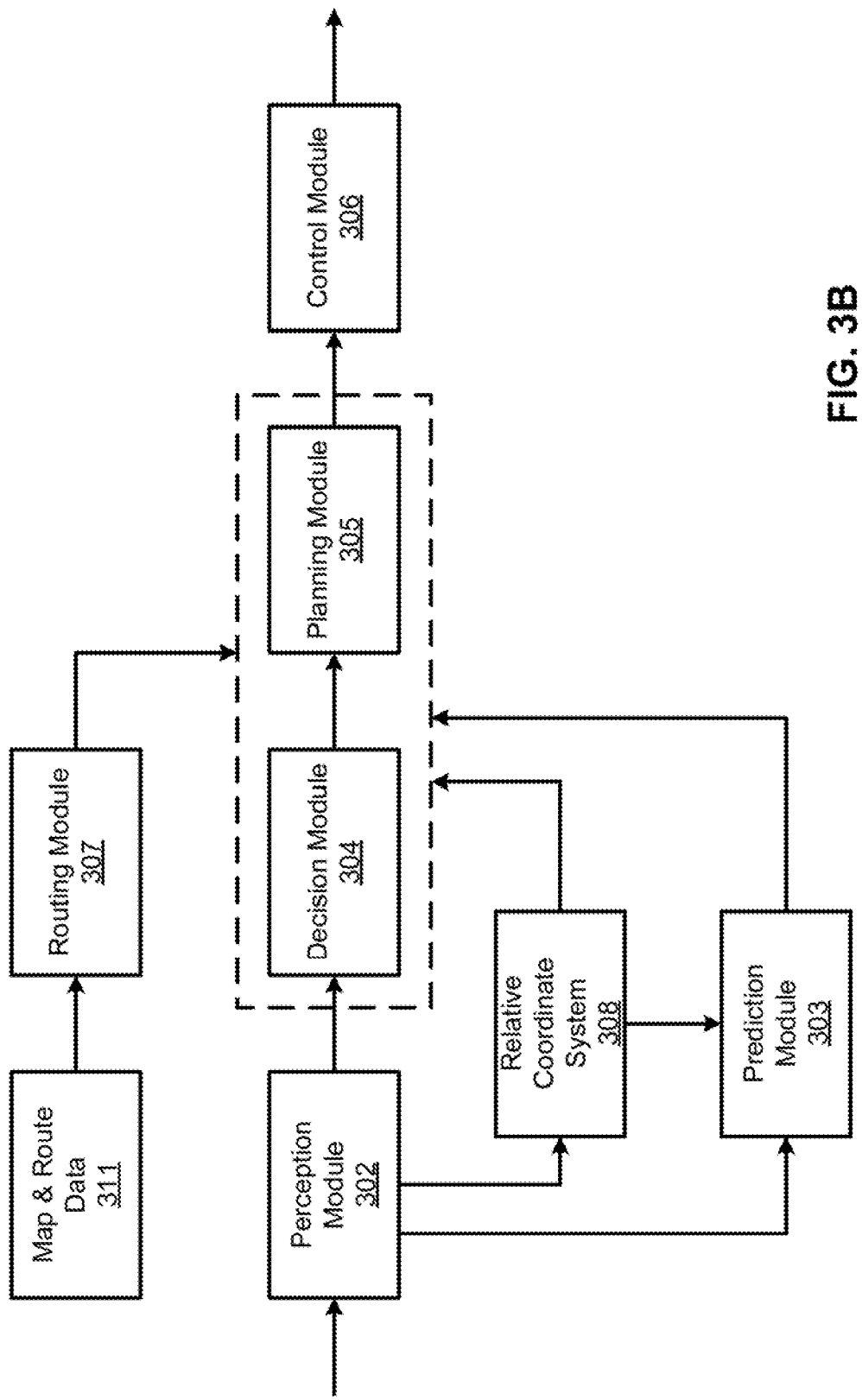

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and relative coordinate system 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or function nalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Typically, localization module 301 operates in a global (or absolute) coordinate mode. When operating in the global coordinate mode, localization module 301 relies on the map data such as map and route information 311 to determine a location of the ADV, the obstacles observed on the road, and the lane configuration of lanes. Such a global localization process may be resource and time consuming and sometimes the map data is unavailable or not updated in time to include the lane or road in which an ADV is driving. Localization module 301 determines the locations of the vehicles and obstacles within a lane or lanes based on the map data in view of other sensor data such as GPS and IMU data.

According to one embodiment, relative coordinate system or module 308 (also referred to as a local coordinate system) may be utilized to determine the locations of objects (e.g., ADV, obstacles) within a lane or lanes without using the map data. The relative coordinate system 308 may be invoked under certain specific circumstances, in which there is need to use map data or the map data is unavailable. For example, when an ADV is driving on a highway, relative coordinate system 308 may be utilized to control the ADV to just simply follow the lane, since there is a fewer number of intersections or exits on the highway. In such a situation, there is no need to use map data since it will require more processing resources and time. In other situations, the map data may be simply unavailable or the map data has not been updated to reflect the changes of the highway (e.g., new highway).

In one embodiment, relative coordinate system 308 determines the relative locations of the obstacles and the lane configuration of the lanes relative to the current location of the ADV, without having to use the map data. Such a relative localization process can be performed much faster since it does not rely on the map data. However, the exact locations of the obstacles may not be accurately determined. However, when traveling on a highway, an ADV may just need to follow the lane most of the time since the highway tends to have a fewer number of intersections or exits. Thus, it can be more efficient to invoke relative coordinate system 308 when traveling on a highway.

Figure 4:
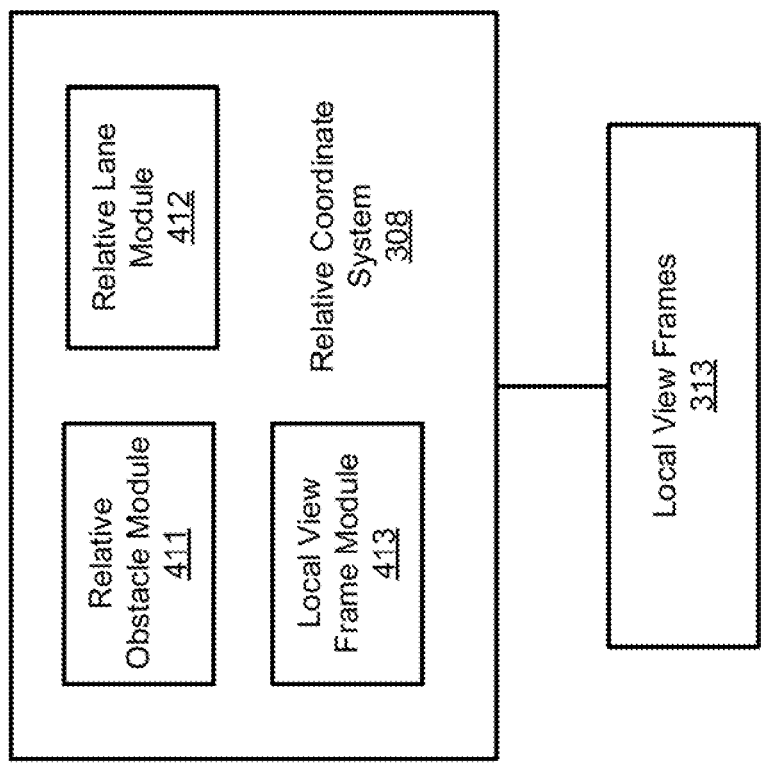
FIG. 4 is a block diagram illustrating an example of a relative coordinate system according to one embodiment.

FIG. 4 is a block diagram illustrating an example of a relative coordinate system according to one embodiment. Referring to FIG. 4, relative coordinate system 308 includes relative obstacle module 411, relative lane module 412, and local view module 413. Relative obstacle module 411 is configured to determine the obstacle information describing one or more obstacles detected on the lane(s) or road relative to a current location of the ADV. Each of the obstacles is described with a relative location (e.g., x, y coordinates) relative to the current location of the ADV. Relative lane module 412 is configured to determine a relative lane configuration of the lane or lanes relative to the current location of the ADV. The lanes may include the current lane in which the ADV is driving and one or more lanes adjacent to the current lane. The obstacle information and the lane configuration information are compiled based on the images captured by the sensors, without using the map data such as map data 311. Based on the obstacle information and the lane configuration information, local view module 413 is configured to generate a local view frame having information describing the driving environment relative to the current location or from a view point of the ADV. In one embodiment, for each of the driving cycles, a local view frame is generated, which may be stored and maintained in a persistent storage device as a part of local view frames 313.

Figure 5:
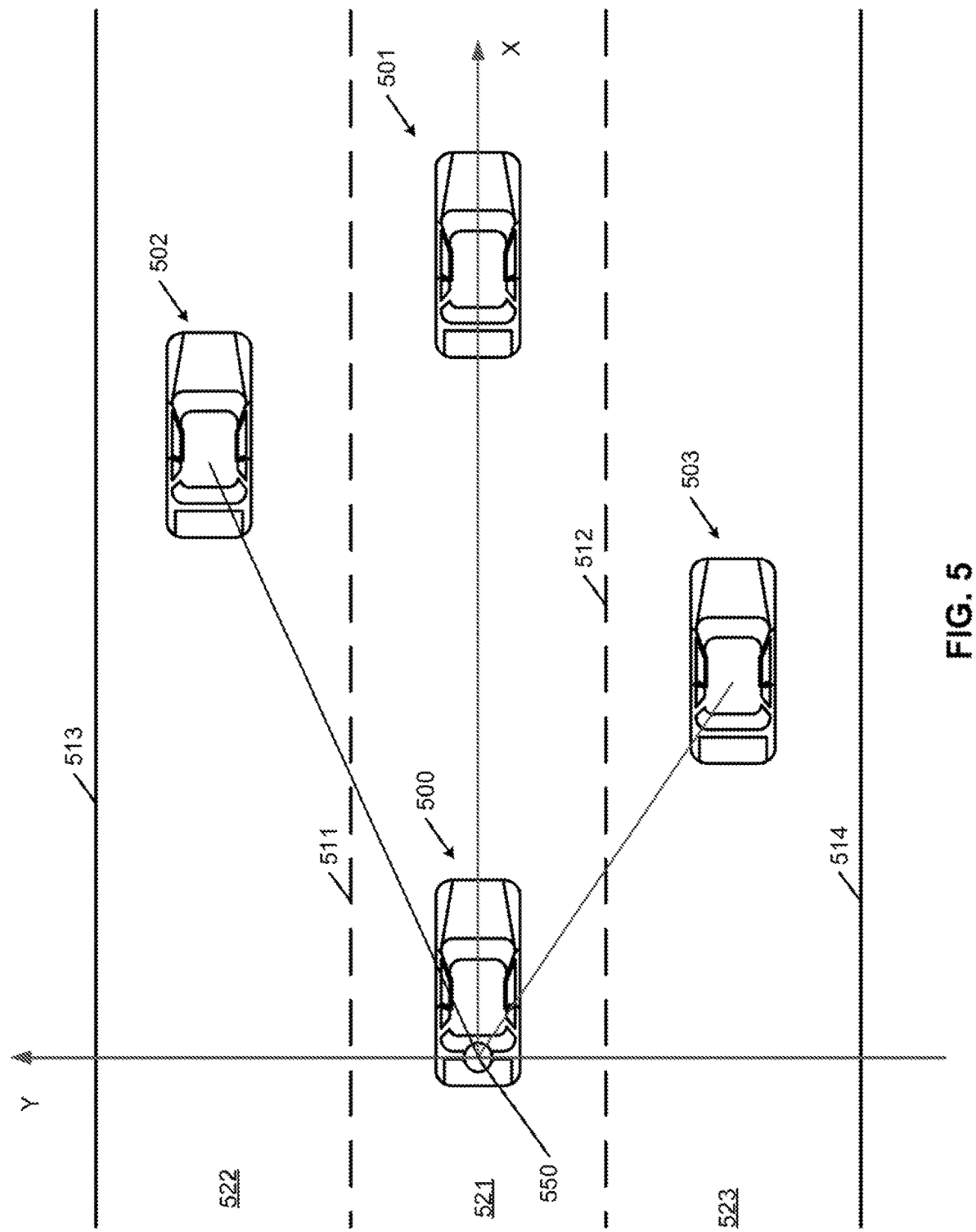
FIG. 5 is a block diagram illustrating a process of determining obstacle and lane information according to one embodiment.

FIG. 5 is a block diagram illustrating a process of determining obstacle and lane information according to one embodiment. Referring to FIG. 5, in this example, it is assumed that ADV 500 is driving in center lane 521 forward along the X axis between adjacent lanes 522-523. Obstacle 501 is within lane 521; obstacle 502 is located in lane 522; and obstacle 503 is located in lane 523. Based on the images of the lanes 521-523 and obstacles 501-503, obstacle module 411 is configured to determine a relative position or location of each of obstacles 501-503 relative to a predetermined reference point of ADV 500. In this example, the reference point 550 is selected the center of the rear axle; however, other reference point locations may also be applicable.

In one embodiment, obstacle module 411 performs an image process on an image of each obstacle to measure the distance between ADV 500 and the obstacle without using map data. For example, for obstacle 502, the distance between obstacle 502 and reference point 550 is measured using a predetermine image processing algorithm that is specifically created for such purposes. A relative coordinate (x, y) is determined for obstacle 502. The coordinate x of an obstacle represents a distance on the X axis relative to reference point 550 (e.g., longitudinal coordinate) and coordinate y of the obstacle represents a distance on the Y axis relative to reference point 550 (e.g., lateral coordinate). Thus, in this example, a positive y coordinate of an obstacle indicates that the obstacle is located on the left side of ADV 500, while a negative y coordinate indicates that the obstacle is on the right side of ADV 500. Thus, in this example, the y coordinate of obstacle 502 will be positive, while they coordinate of obstacle 503 will be negative.

In addition, based on the images of the lanes 521-523, lane module 412 is configured to identify an edge of each lane and measure a distance between reference point 550 and the edge of the lane. For example, for lane 521, lane module 412 determines and measures a first distance between reference point 550 and left lane edge (or left lane boundary) 511 and a second distance between reference point 550 and right lane edge 512. The first distance and the second distance can be utilized to calculate a lane width of lane 521. A reference point of a reference line at that particular point in time can also be determined, assuming a reference line of a lane is located at the center of the lane. Similarly, the lane width and reference point of the reference line of lane 522 can be determined by recognizing and measuring the distances between reference point 550 and lane boundaries 511 and 513. The lane width and reference point of the reference line of lane 523 can be determined by recognizing and measuring the distances between reference point 550 and lane boundaries 512 and 514.

Based on the relative locations of the obstacles 501-503 and lane configurations (e.g., lane width, reference point) of lanes 521-523, a local view frame can be created containing information describing the relative locations of obstacles 501-503 and lane configuration at the point in time corresponding to the driving cycle. The local view frame is then stored in a persistent storage device. As described above, for each of the driving cycles, the autonomous driving process is repeatedly performed. For each of the driving cycle, a local view frame is created. By comparing the local view frames, the movement of obstacles 501-503 and the lane configuration (e.g., width, shape/curve) can be tracked. As a result, the speed and heading direction of obstacles 501-503 can also be determined based on the sequence of the local view frames.

According to one embodiment, for each of the lanes 511-513, a local view frame is generated to represent the driving environment of the lane. Thus, each lane is associated with a sequence of local view frames generated over a series of driving cycles. Once the local view frames have been generated, the local view frames are passed to the next processing stage such as planning and control stages. The planning and control stages will operate the same manner regardless whether the localization is performed in a global/absolute mode or a local/relative mode.

Figure 6:
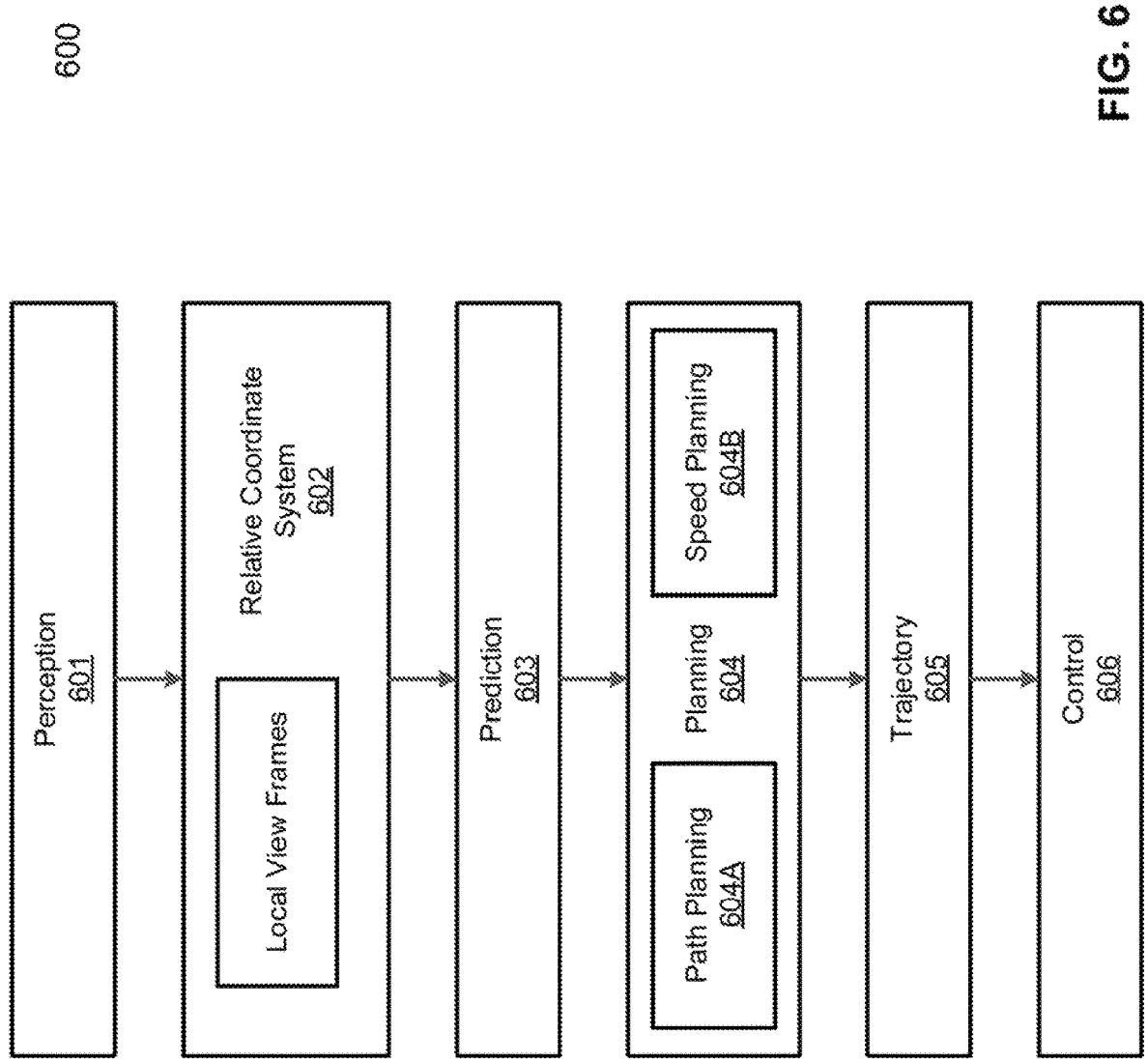
FIG. 6 is a processing flow diagram illustrating processing stages of operating an autonomous driving vehicle according to one embodiment.

FIG. 6 is a processing flow diagram illustrating processing stages of operating an autonomous driving vehicle according to one embodiment. Referring to FIG. 6, processing flow 600 includes, amongst others, perception stage 601, relative coordinate processing stage 602, prediction stage 603, planning stage 604, trajectory generating stage 605, and control stage 606. Perception stage 601 is primarily performed by perception module 302 to perceive a driving environment surrounding an ADV, including obtaining images captured by a variety of sensors (e.g., LIDAR, RADAR, cameras). Relative coordinate processing stage 602 is primarily performed by relative coordinate system 308, which may be invoked in response to certain circumstances such as driving on a highway.

As described above, relative coordinate processing stage 602 determines obstacle information and lane configuration information based on perception information provided by perception stage 601, and generates local view frames based the obstacle information and lane information. The local view frames are similar to the localization data generated from localization module 301, but at a relative or local coordinate reference point and without having to use map and route information. Thereafter, the prediction stage 603 and planning stage 604 are similar to the regular prediction and planning processes as described above with respect to FIGS. 3A and 3B, but again on a relative coordination. The purpose of the planning is to plan a trajectory 605 based on the local view frames such that the ADV can follow the lane in which the ADV is moving.

Figure 7:
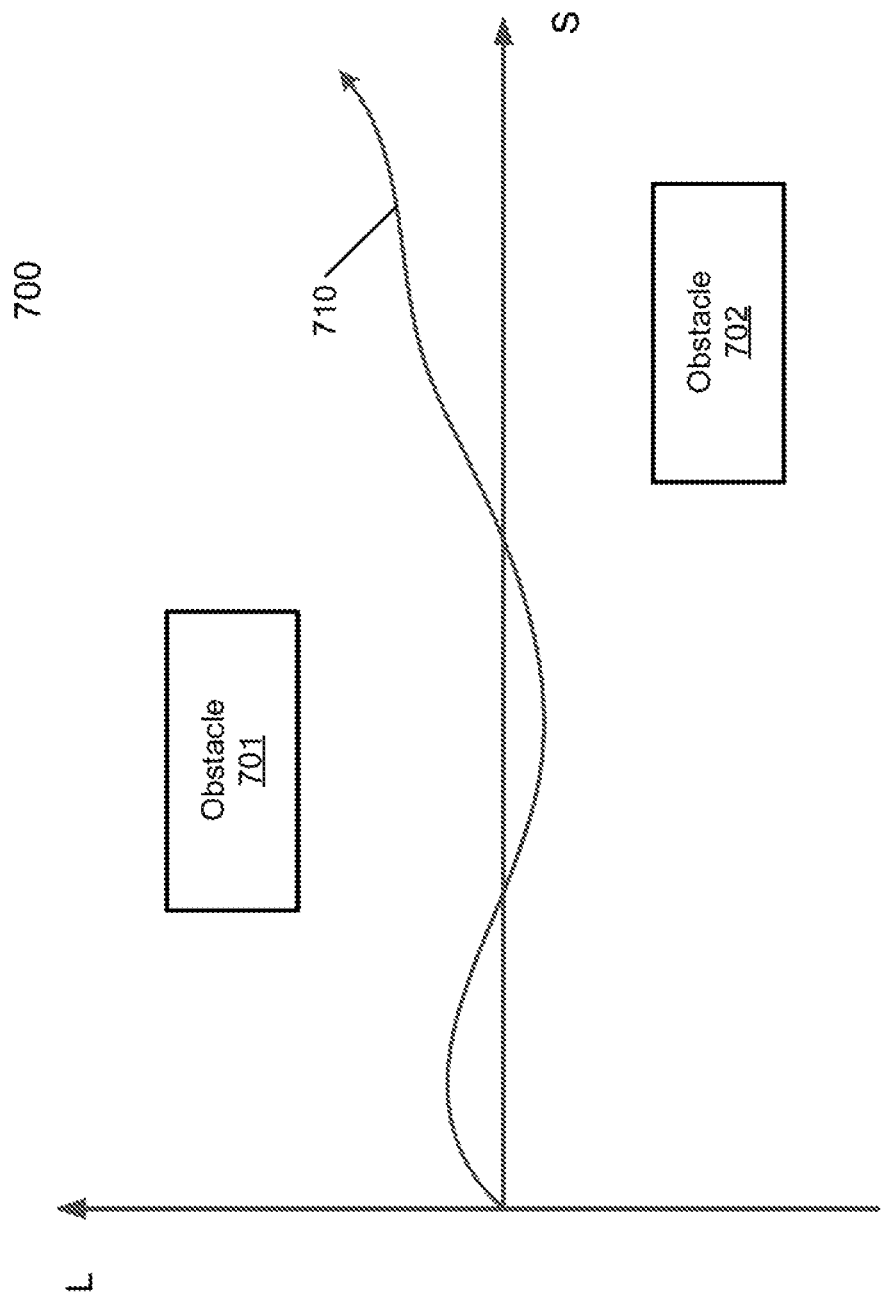
FIG. 7 is a diagram illustrating an example of a station-lateral map according to one embodiment.

Planning stage 604 includes path planning and optimization stage 604A and speed planning and optimization stage 604B. During path planning and optimization stage 604A, a station-lateral (SL) map is generated based at least in part on the local view frames, such as SL map 700 as shown in FIG. 7. Referring now to FIG. 7, SL map 700 captures the obstacles relative to the current location of an ADV in two dimensions. The S dimension refers to a longitudinal distance along a reference line of a lane from the current location of the ADV. The L dimension refers to a lateral distance between an obstacle and the reference line at a particular longitudinal position with respect to the current location of the ADV. A positive L value of an obstacle indicates that the obstacle is located on the left side of the reference line or the ADV, assuming the ADV is trying to follow the reference line in general. A negative L value of an obstacle indicates that the obstacle is located on the right side of the reference line or the ADV. In this example, obstacle 701 will be on the left side of the reference line or ADV, while obstacle 702 will be on the right side of the reference line or ADV. The SL graph or curve 710 represents the path that the ADV will follow after the path planning, in this example, to navigate between obstacles 701-702 to avoid collision.

Figure 8:
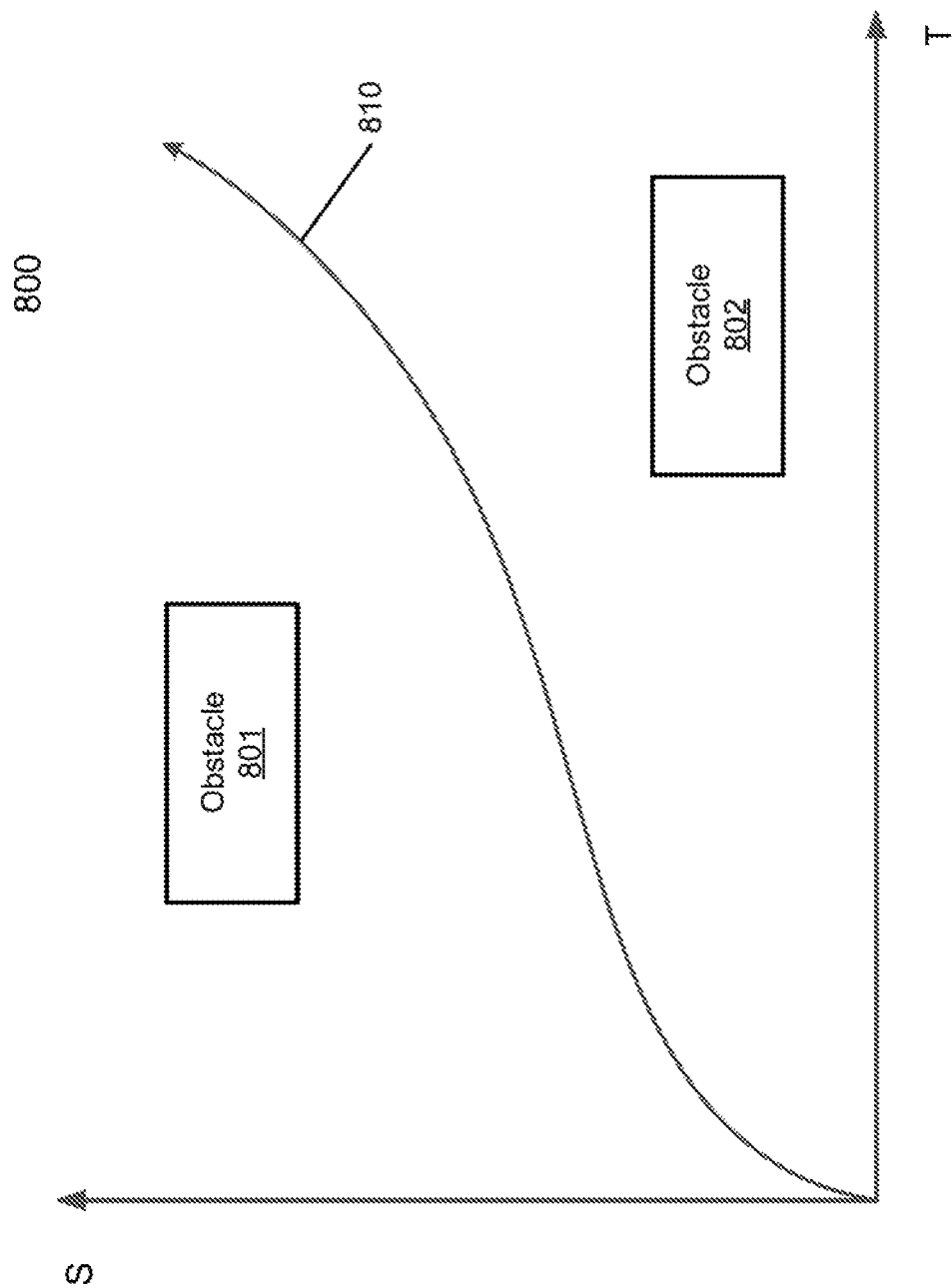
FIG. 8 is a diagram illustrating an example of a station-time graph according to one embodiment.

During the speed planning and optimization stage 704B, a station-time (ST) graph is generated based at least in part on the local view frames, such as ST graph 800 as shown in FIG. 8. Referring now to FIG. 8, ST graph 800 captures the path of the ADV in view of the distance from the current location at different points in time. The S dimension refers to a distance from the current location of the ADV and T dimension refers to the time. Thus, as shown in FIG. 8, the curve 810 indicates the locations in a form of a distance from the current location of the ADV at different points in time. The ST graph 800 also indicates the relative locations of obstacles, in this example, obstacles 801-802 relative to the current location of the ADV at different points in time. Thus, based on curve 810, the ADV is planned to follow or yield to obstacle 801, but overtake or pass over obstacle 802. As a result, the SL map 700 and ST graph 800 can be generated based on the local view frames without having to use map data and other ordinary localization processes.

Figure 9:
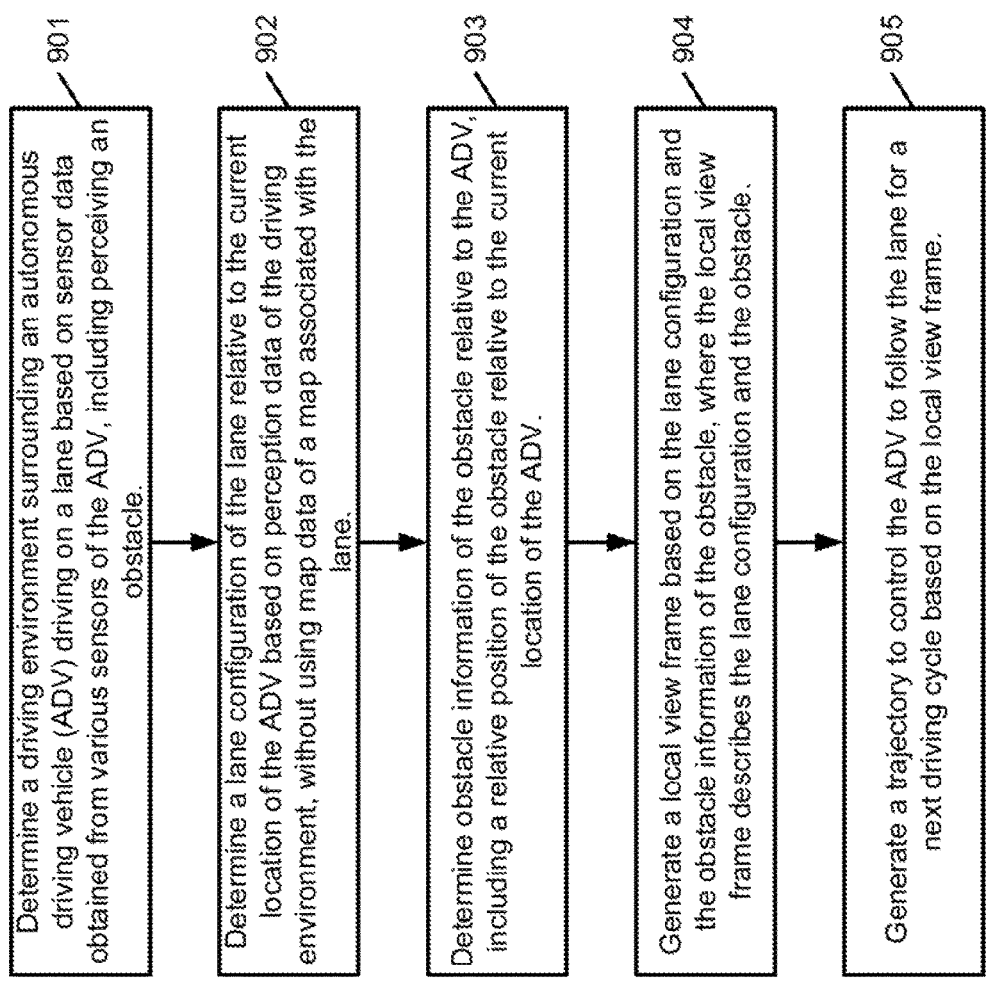
FIG. 9 is a flow diagram illustrating a process of operating an autonomous driving vehicle according to one embodiment.

FIG. 9 is a flow diagram illustrating a process of operating an autonomous driving vehicle without using map data and localization according to one embodiment. Process 900 may be performed by processing logic which may include software, hardware, or a combination thereof. For example, process 900 may be performed by system 300 of FIG. 3A. Referring to FIG. 9, in operation 901, processing logic determines a driving environment surrounding an ADV that is driving on a lane based on sensor data provided by a variety of sensors mounted on the ADV, including perceiving at least one obstacle. In operation 902, processing logic determines a lane configuration of the lane relative to a current location of the ADV based on the perception data of the driving environment, without using map data of a map associated with the lane. In operation 903, processing logic determines obstacle information of the obstacle relative to the ADV, including a relative position of the obstacle relative to the current location of the ADV. In operation 904, generating a local view frame based on the lane configuration and the obstacle information of the obstacle. The local view frame includes information describing the lane configuration and the obstacle from a view point of the ADV without map information. In operation 905, processing logic generates a trajectory based on the local view frame to control the ADV to follow the lane for a next driving cycle.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 10:
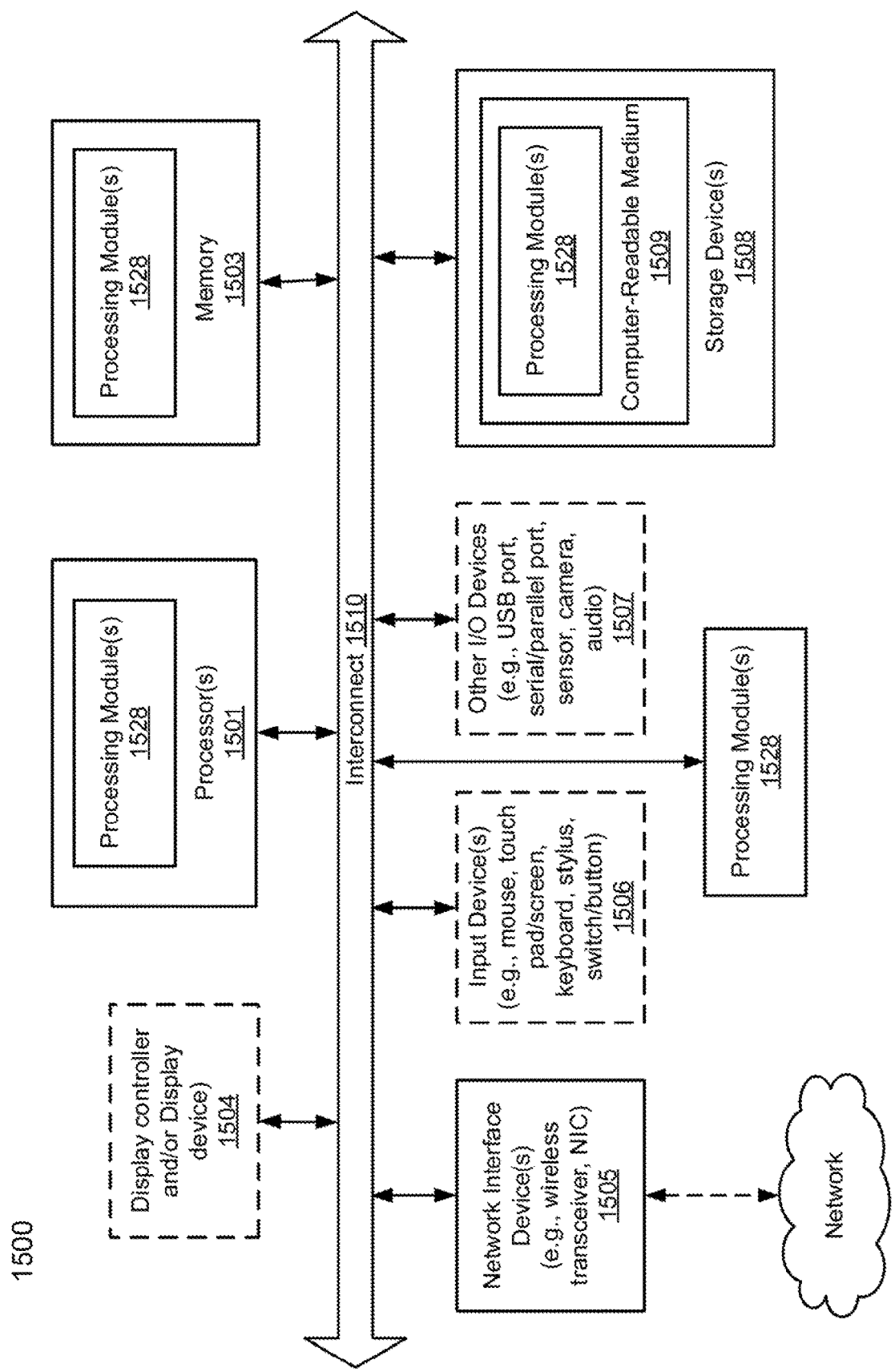
FIG. 10 is a block diagram illustrating a data processing system according to one embodiment.

FIG. 10 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, and/or relative coordinate system 308. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for generating a trajectory for operating an autonomous driving vehicle to follow lanes, the method comprising:
    determining a driving environment surrounding an autonomous driving vehicle (ADV) driving on a lane based on sensor data obtained from a plurality of sensors;
    determining a lane configuration of the lane relative to a current location of the ADV based on perception data of the driving environment, without using map data of a map associated with the lane;
    determining obstacle information of an obstacle relative to the ADV, including a relative position of the obstacle relative to the current location of the ADV;
    generating a local view frame based on the lane configuration and the obstacle information, the local view frame describing the lane configuration and the obstacle from a view point of the ADV without map information;
    generating a trajectory for the ADV to follow the lane for a next driving cycle based on the local view frame;
    generating a reference line that represents a center line within the lane;
    generating a station-lateral (SL) map based on the lane configuration and the obstacle information, wherein the SL map includes information describing a lateral position of the obstacle relative to the reference line and a vertical position relative to the current location of the ADV, and wherein the SL map is utilized to optimize a shape of the trajectory; and
    controlling the ADV based on the trajectory to follow the lane.

2. The method of claim 1, further comprising, prior to determining the lane configuration of the lane, determining that the ADV is driving on a highway based on the perception data of the perceived driving environment, wherein the lane configuration is determined in response to determining that the ADV is driving on a highway.

3. The method of claim 1, further comprising, for each of a plurality of driving cycles,
    iteratively performing determining the driving environment, determining the lane configuration, determining the obstacle information, and generating the local view frame for the corresponding driving cycle wherein the local view frames associated with the driving cycles are utilized to create the trajectory.

4. The method of claim 1, wherein the lane is one of a plurality of lanes of a road in which the ADV is driving, wherein generating a trajectory to drive the ADV comprises:
    generating a plurality of local view frames, one for each of the plurality of lanes based on the lane configuration and the obstacle information;
    generating a plurality of paths, one for each of the local view frames; and
    selecting one of the paths based on a path cost associated with each of the paths using a predetermined cost function, wherein the selected path is utilized to generate the trajectory.

5. The method of claim 1, wherein determining lane configuration of the lane relative to the ADV comprises:
    measuring a first distance between the current location of the ADV and a first edge of the lane based on a first image of the first edge;
    measuring a second distance between the current location of the ADV and a second edge of the lane based on a second image of the second edge; and
    calculating a lane width of the lane based on the first distance and the second distance.

6. The method of claim 1, wherein the reference line is generated based on the lane width of the lane and based on the lane configuration without the map data.

7. The method of claim 1, further comprising generating a station-time (ST) graph based on the lane configuration and the obstacle information, wherein the ST graph includes information describing a relative position of the obstacle relative to the reference line at different points in time, and wherein the ST graph is utilized to optimize a speed of the ADV at different points in time along the trajectory.

8. The method of claim 1, wherein the current location of the ADV is measured based on a position of a center of a rear axle of the ADV.

9. A non-transitory machine-readable medium having instructions stored therein, which when executed by a processor, cause the processor to perform operations, the operations comprising:
  determining a driving environment surrounding an autonomous driving vehicle (ADV) driving on a lane based on sensor data obtained from a plurality of sensors of the ADV, including perceiving an obstacle;
  determining a lane configuration of the lane relative to a current location of the ADV based on perception data of the driving environment, without using map data of a map associated with the lane;
  determining obstacle information of an obstacle relative to the ADV, including a relative position of the obstacle relative to the current location of the ADV;
  generating a local view frame based on the lane configuration and the obstacle information of the obstacle, the local view frame describing the lane configuration and the obstacle from a view point of the ADV without map information;
  generating a trajectory to follow the lane for a next driving cycle based on the local view frame;
  generating a reference line that represents a center line within the lane;
  generating a station-time (ST) graph based on the lane configuration and the obstacle information, wherein the ST graph includes information describing a relative position of the obstacle relative to the reference line at different points in time, and wherein the ST graph is utilized to optimize a speed of the ADV at different points in time along the trajectory; and
  controlling the ADV based on the trajectory to follow the lane.

10. The machine-readable medium of claim 9, wherein the operations further comprise, prior to determining the lane configuration of the lane, determining that the ADV is driving on a highway based on the perception data of the perceived driving environment, wherein the lane configuration is determined in response to determining that the ADV is driving on a highway.

11. The machine-readable medium of claim 9, wherein the operations further comprise, for each of a plurality of driving cycles,
  iteratively performing determining the driving environment, determining the lane configuration, determining the obstacle information, and generating the local view frame for the corresponding driving cycle wherein the local view frames associated with the driving cycles are utilized to create the trajectory.

12. The machine-readable medium of claim 9, wherein the lane is one of a plurality of lanes of a road in which the ADV is driving, wherein generating a trajectory to drive the ADV comprises:
  generating a plurality of local view frames, one for each of the plurality of lanes based on the lane configuration and the obstacle information;
  generating a plurality of paths, one for each of the local view frames; and
  selecting one of the paths based on a path cost associated with each of the paths using a predetermined cost function, wherein the selected path is utilized to generate the trajectory.

13. The machine-readable medium of claim 9, wherein determining lane configuration of the lane relative to the ADV comprises:
  measuring a first distance between the current location of the ADV and a first edge of the lane based on a first image of the first edge;
  measuring a second distance between the current location of the ADV and a second edge of the lane based on a second image of the second edge; and
  calculating a lane width of the lane based on the first distance and the second distance.

14. The machine-readable medium of claim 9, wherein the reference line is generated based on the lane width of the lane and based on the lane configuration without the map data.

15. The machine-readable medium of claim 9, wherein the operations further comprise generating a station-lateral (SL) map based on the lane configuration and the obstacle information, wherein the SL map includes information describing a lateral position of the obstacle relative to the reference line and a vertical position relative to the current location of the ADV, and wherein the SL map is utilized to optimize a shape of the trajectory.

16. The machine-readable medium of claim 9, wherein the current location of the ADV is measured based on a position of a center of a rear axle of the ADV.

17. A data processing system, comprising:
  a processor; and
  a memory coupled to the processor to store instructions, which when executed by the processor, cause the processor to perform operations, the operations including
    determining a driving environment surrounding an autonomous driving vehicle (ADV) driving on a lane based on sensor data obtained from a plurality of sensors of the ADV, including perceiving an obstacle,
    determining a lane configuration of the lane relative to a current location of the ADV based on perception data of the driving environment, without using map data of a map associated with the lane,
    determining obstacle information of an obstacle relative to the ADV, including a relative position of the obstacle relative to the current location of the ADV,
    generating a local view frame based on the lane configuration and the obstacle information of the obstacle, the local view frame describing the lane configuration and the obstacle from a view point of the ADV without map information,
    generating a trajectory to control the ADV to follow the lane for a next driving cycle based on the local view frame,
    generating a reference line that represents a center line within the lane;
    generating a station-lateral (SL) map based on the lane configuration and the obstacle information, wherein the SL map includes information describing a lateral position of the obstacle relative to the reference line and a vertical position relative to the current location of the ADV, and wherein the SL map is utilized to optimize a shape of the trajectory; and
    controlling the ADV based on the trajectory to follow the lane.

18. The system of claim 17, wherein the operations further comprise, prior to determining the lane configuration of the lane, determining that the ADV is driving on a highway based on the perception data of the perceived driving environment, wherein the lane configuration is determined in response to determining that the ADV is driving on a highway.

* * * * *